United States Patent [19]

Nepela et al.

[11] Patent Number: 5,768,073
[45] Date of Patent: Jun. 16, 1998

[54] THIN FILM MAGNETIC HEAD WITH REDUCED UNDERSHOOT

[75] Inventors: Daniel A. Nepela, San Jose; Charles R. Bond, Milpitas, both of Calif.

[73] Assignee: Read-Rite Corporation, Milpitas, Calif.

[21] Appl. No.: 813,118

[22] Filed: Feb. 7, 1997

Related U.S. Application Data

[63] Continuation of Ser. No. 496,299, Jun. 29, 1995, abandoned.

[51] Int. Cl.$^6$ ................................................. G11B 5/147
[52] U.S. Cl. ................................................................ 360/126
[58] Field of Search ................................... 360/126, 125, 360/127

[56] References Cited

U.S. PATENT DOCUMENTS 3,549,428  12/1970  Lommez .
4,242,710  12/1980  Hempstead et al. ............... 360/126
4,550,353  10/1985  Hirai et al. ......................... 360/126
4,716,484  12/1987  Kaminak et al. ................... 360/126

Primary Examiner—Stuart S. Levy
Assistant Examiner—David D. Davis
Attorney, Agent, or Firm—Nathan N. Kallman

[57] ABSTRACT

A magnetic thin film head with reduced undershoot characteristics includes a pair of relatively high permeability pole members having a low permeability gap member therebetween. Disposed adjacent to the surfaces of the pole members, which are opposite to the gap member, are layers of magnetic material of lower permeability than the permeability of the pole members, these lower permeability layers having a Curie point temperature which is within the operating temperature range of the head so that these lower permeability layers are paramagnetic. In operation, the lower permeability layers provide a change in permeability across the head gap which reduces the transition in permeability at the head pole tips, thereby reducing undershoots.

4 Claims, 1 Drawing Sheet

THIN FILM MAGNETIC HEAD WITH REDUCED UNDERSHOOT

This application is a continuation application Ser. No. 08/496,299, filed Jun. 29, 1995 now abandoned.

FIELD OF THE INVENTION

The present invention relates to thin film magnetic recording heads, and more particularly to an improved thin film magnetic head design which reduces undershoot interference.

DESCRIPTION OF THE PRIOR ART

In a magnetic storage system, digital information is magnetically stored on the surface of a magnetic medium such as a rotating magnetic storage disk. The digital information is recorded by selectively polarizing the magnetic field of consecutive areas along the surface of the magnetic disk. When this recorded information is read back from the disk, the magnetic polarization of the medium is sensed as an electrical output signal. The read and write operations are performed by a magnetic read/write head which flies over the surface of the rotating disk.

The electrical output signal is representative of both the relative strength of the magnetization in the magnetic medium and the magnetic field pattern sensed by the read head. The readback signal comprises a series of superimposed signals whose existence and location represent digital information.

Signal recovery errors will result if the read signal detection circuitry is confused in any one of the following three ways:

1) Detecting a signal that was not recorded;
2) Rejecting a signal that was recorded;
3) Placing a recorded signal in the wrong clock cell.

Cost effective detectors presently in use can be confused by leading and trailing edge undershoots in the isolated readback pulse just as easily as they are confused by noise. Undershoot occurs due to discontinuities in the magnetic readback flux path characteristic of the finite pole lengths of the thin film recording head. These undershoots reduce the maximum recording density which may be achieved in a magnetic storage system. Rather than attempting to compensate for undershoots in the detected signal using sophisticated electronic decoding techniques, it would be highly desirable to provide a thin film magnetic head which minimizes leading and trailing undershoots in the isolated readback pulses.

Some prior art approaches to undershoot reduction involve the shaping of the pole tips, such as by notching or rounding, to reduce the magnetic discontinuities in the pole tip areas. One example of this approach is shown in U.S Pat. No. 5,130,877, Hsie et al, which discloses a thin film head structure employing a ferrite substrate and utilizing a top pole piece which is sloped away from the plane of the recording medium to reduce magnetic discontinuities in the magnetic flux path of the head.

Another approach to undershoot reduction is set out in U.S. Pat. No. 5,146,379, Iwata et al. In that patent the thin film head includes a pair of magnetic pole members having a relatively high permeability µ1 and separated from each other by a gap member having a relatively low permeability µ2. Permeability is defined as the ratio of B/H, where B is magnetic flux induction and H is magnetizing force, as is known in the prior art. On the sides of the pole members opposite to the gap member are layers of magnetic permeability µ3 composed of insulating ferrite members, µ3 being less than the permeability µ1 of the magnetic pole members but greater than the permeability µ2 of the gap member. This structure is said to reduce the "dip" in the magnetic head output and improve the head frequency response as a result of the graduated permeability across the head.

SUMMARY OF THE INVENTION

The present invention utilizes a thin film head structure including a pair of spaced magnetic members of relatively high permeability with a nonmagnetic gap member therebetween. On the sides of the high permeability magnetic members opposite the gap member are members of lower permeability metallic magnetic material, these lower permeability members being selected to have a Curie point temperature within the operating temperature range of the head such that the lower permeability members have a small induction B versus a magnetic field strength H, resulting in a low permeability ratio B/H. As is well known, when ferromagnetic materials are heated to or above their Curie point temperature, they become paramagnetic, in which state their permeability becomes unity, i.e., that of free space. One particularly suitable magnetic alloy for the low permeability members of this invention is Ni Cu Fe, the alloy composition being 67% Ni, 30% Cu and 2% Fe, by weight percent. Such an alloy can be sputtered or electrodeposited and has a corrosion resistance approximately equal to Permalloy, which is an 80:20 NiFe alloy.

DESCRIPTION OF THE PREFERRED EMBODIMENT

Figure 1:
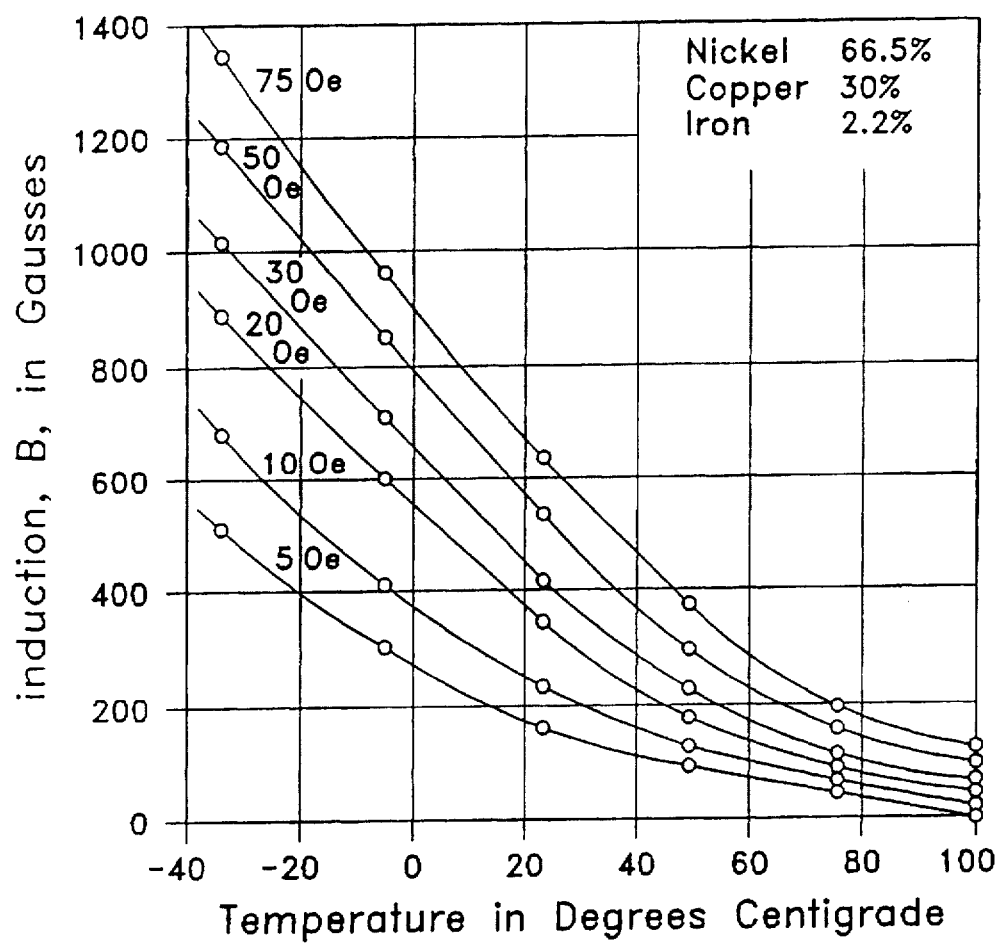
FIG. 1 is a graph of induction B versus temperature at different magnetic field strengths for the preferred lower permeability alloy used in the present invention.
Figure 2:
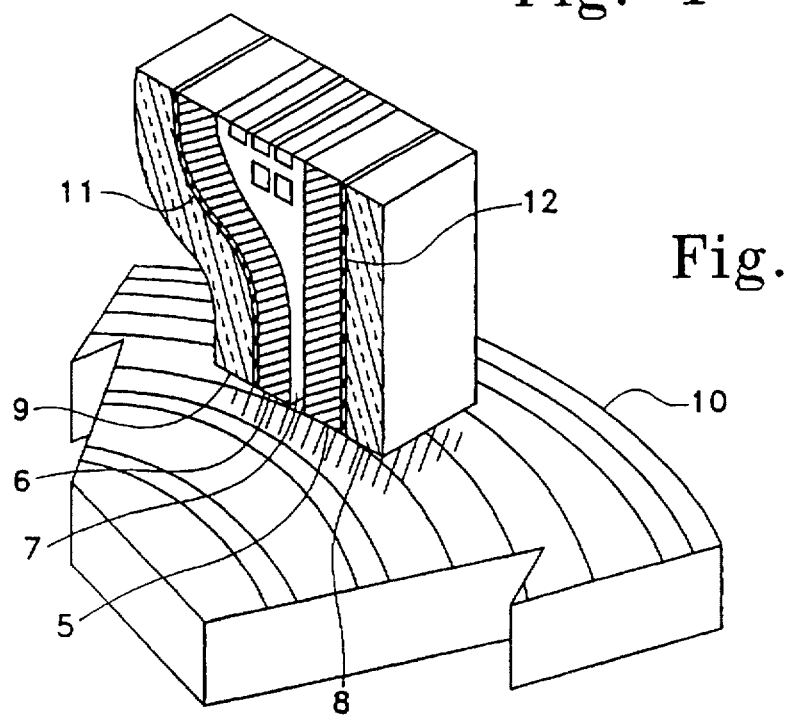
FIG. 2 is an isometric view, partly in cross-section, of a magnetic thin film head in accordance ith this invention.

The graph of FIG. 1 is a plot of induction B versus temperature for different values of magnetic field strength H in connection with a metal magnetic alloy known as Calmalloy No. 2 comprising nickel, copper and iron. From FIG. 1 it can be seen that the alloy represented there, in the operating temperature range of the magnetic head (30°–70° C.), has a permeability somewhat dependent on the magnetic field H. For the plotted values, this permeability varies somewhat and is in the range of approximately 5–10 for this alloy for bit fields from the media ranging from 40 to 80 oersteds. FIG. 2 shows a magnetic head structure including a pair of spaced pole members 5, 6 of a relatively high permeability material such as the nickel-iron alloy Permalloy, each pole member being deposited to a thickness in the range of 1–5 microns. Spaced pole members 5, 6 are separated from each other by a nonmagnetic gap member 7 to form a read/write gap between members 5, 6. Disposed on the surfaces of members 5, 6 opposite to gap member 7 are metallic layers 8, 9 of relatively low permeability compared to the permeability of pole members 5, 6. As discussed above, layers 8, 9 are formed of a material that operates in a temperature range which is near or slightly below its Curie point temperature so that the material has a low magnetic induction, i.e., less than 1,000 G. Layers 8, 9 preferably have a permeability between 2–30 and may be deposited by plating or sputtering on layers 5 and 6 with a thickness of 2–8 microns.

As an additional feature of the present invention, intermediate layers 11, 12 of nonmagnetic material such as $Al_2O_3$, $T_1O_2$ or paramagnetic metallic layers may be interposed between layers 5 and 8 and between layers 6 and 9 to magnetostatically couple these pairs of layers. These intermediate coupling layers preferably would have a thickness in the range of 50–500 A°.

What is claimed is:

1. A thin film magnetic transducer comprising a pair of spaced magnetic pole members of relatively high permeability, with a B/H ratio of 5–10 approximately, each of said pole members having a thickness in the range of 1–5 microns;
   a nonmagnetic layer disposed between the ends of said pole members to form a nonmagnetic gap; and
   layers of metallic magnetic material, each having a thickness in the range of 2–8 microns and formed by sputtering or electrodeposition, and having a relatively lower permeability than that of said magnetic pole members, said layers of metallic magnetic material being members and on the sides thereof opposite to said nonmagnetic magnetostatically coupled with respective ones of said magnetic pole members, said layers of metallic magnetic material operating below the Curie point temperature, wherein the Curie point temperature of said lower permeability material is in the range of 60°–100° C. and said metallic magnetic material having a permeability with a B/H ratio between approximately 2 and 30 a layer of magnetostatically coupling material disposed between each of said layers of lower permeability material and its adjacent magnetic pole member of relatively high permeability material.

2. A transducer in accordance with claim 1 where the magnetic induction B of said lower permeability metallic magnetic material is less than 1,000 Gauss.

3. A transducer in accordance with claim 1 in which said lower permeability magnetic material comprises an alloy of Ni, Cu and Fe.

4. A transducer in accordance with claim 3 in which said low permeability magnetic material comprises approximately 67% Ni, 30% Cu and 2% Fe.

* * * * *